United States Patent
Roux et al.

(10) Patent No.: US 7,204,545 B2
(45) Date of Patent: Apr. 17, 2007

(54) FENDER SUPPORT FOR A MOTOR VEHICLE

(75) Inventors: Jean-Pierre Roux, Pommiers (FR); Frédéric Pierrot, Amberieu en Bugey (FR); Gérald Andre, Amberieu en Bugey (FR); Hugues Cheron, Meximieux (FR)

(73) Assignee: Compagnie Plastic Omnium, Lyons (FR)

( * ) Notice: Subject to any disclaimer, the term of this patent is extended or adjusted under 35 U.S.C. 154(b) by 0 days.

(21) Appl. No.: 10/858,465

(22) Filed: Jun. 2, 2004

(65) Prior Publication Data

US 2005/0057076 A1    Mar. 17, 2005

(30) Foreign Application Priority Data

Jun. 3, 2003    (FR) .................................... 0306675
Sep. 23, 2003   (FR) .................................... 0311159

(51) Int. Cl.
    *B60R 21/34*    (2006.01)
(52) U.S. Cl. ............................... 296/187.09; 296/187.04
(58) Field of Classification Search ........... 296/187.01, 296/187.03, 187.04, 187.09, 187.12, 193.05, 296/203.01, 203.02, 203.03
    See application file for complete search history.

(56) References Cited

U.S. PATENT DOCUMENTS

| 5,171,058 | A  | * | 12/1992 | Ishikawa ............... 296/187.12 |
| 5,196,857 | A  | * | 3/1993  | Chiappetta et al. ......... 343/881 |
| 6,209,950 | B1 | * | 4/2001  | Hanyu .................... 296/203.02 |
| 6,237,990 | B1 | * | 5/2001  | Barbier et al. ......... 296/187.09 |
| 6,332,642 | B1 | * | 12/2001 | Hanyu .................... 296/203.02 |
| 6,554,341 | B2 | * | 4/2003  | Lee ............................ 296/29 |
| 6,612,644 | B2 | * | 9/2003  | Ahn ....................... 296/187.04 |
| 6,676,197 | B2 | * | 1/2004  | Ozawa .................... 296/187.03 |
| 6,698,820 | B2 | * | 3/2004  | Nakata ................... 296/193.09 |
| 6,805,400 | B2 | * | 10/2004 | Bruderick et al. ...... 296/193.09 |
| 6,824,199 | B2 | * | 11/2004 | Weik et al. ............ 296/187.04 |
| 6,880,883 | B2 | * | 4/2005  | Decker et al. ......... 296/203.02 |
| 2001/0025462 | A1 |   | 10/2001 | Laurent |
| 2002/0060474 | A1 | * | 5/2002  | Chung ........................ 296/189 |

(Continued)

FOREIGN PATENT DOCUMENTS

DE    101 02 187 A    8/2002

(Continued)

OTHER PUBLICATIONS

Search Report for French Application No. 0311159, completed Feb. 26, 2004.

*Primary Examiner*—D. Glenn Dayoan
*Assistant Examiner*—Paul Chenevert
(74) *Attorney, Agent, or Firm*—Griffin & Szipl, P.C.

(57) ABSTRACT

The motor vehicle fender support comprises a metal core with a top portion provided with fasteners for fastening to a fender. The top portion is provided with ribs arranged to stiffen it in the event of stress being directed in the transverse direction, and to buckle in the event of downwardly-directed impacts, when the fender support is mounted on the vehicle. The metal core also includes openings seeking to reduce its stiffness so as to satisfy predefined deceleration criteria. The fender support also comprises a rigid bottom portion designed to be fastened to the structure of the vehicle.

13 Claims, 3 Drawing Sheets

U.S. PATENT DOCUMENTS

| | | | |
|---|---|---|---|
| 2002/0171262 A1* | 11/2002 | Ozawa | 296/189 |
| 2003/0052517 A1* | 3/2003 | Nakata | 296/194 |
| 2003/0090129 A1* | 5/2003 | Riley et al. | 296/203.03 |
| 2004/0108753 A1* | 6/2004 | Bruderick et al. | 296/203.02 |
| 2004/0222665 A1* | 11/2004 | Roeth et al. | 296/187.01 |
| 2004/0251716 A1* | 12/2004 | Choi et al. | 296/187.03 |
| 2005/0040672 A1* | 2/2005 | Andre | 296/187.09 |
| 2005/0057076 A1* | 3/2005 | Roux et al. | 296/198 |

FOREIGN PATENT DOCUMENTS

| | | |
|---|---|---|
| EP | 0839704 A1 | 5/1998 |
| EP | 1 138 579 A | 10/2001 |
| EP | 1 293 417 A | 3/2003 |
| GB | 2 362 615 A | 11/2001 |
| JP | 11-321718 | 11/1999 |
| JP | 2002-249076 | 9/2002 |

* cited by examiner

FENDER SUPPORT FOR A MOTOR VEHICLE

This application claims priority from French Patent Application No. 0306675, filed Jun. 3, 2003, and French Patent Application No. 0311159, filed Sep. 23, 2003, the entire disclosures of the above patent applications are hereby incorporated by reference.

The present invention relates to a fender support for a motor vehicle.

BACKGROUND OF THE INVENTION

It is known to secure a motor vehicle fender to the structure of the vehicle via a support, sometimes referred to as a fender support, which support is itself secured to the rigid structure of the vehicle, itself referred to as the blank body.

Known supports can be fasteners having additional functions such as positioning the fender, the ability to withstand expansion, fusibility in the event of an impact in order to preserve the fender, or indeed backing for the fender so as to increase its dent resistance.

An example of a fender support provided in the state of the art is described in document EP 0 839 704. On its outside face that is to receive a fender, that support carries an array of ribs that matches the inside shape of the fender.

However, those prior art supports are inadequate when it comes to impacts against the heads of pedestrians.

Such impacts are presently defined by the "Pedestrian" working group (WG 17) of the European Enhanced Vehicle Safety Committee and by the EuroNCAP Procedure. Such impacts are downwardly directed with varying angles between the direction of the impact and the ground. The impactor that models a pedestrian's head is spherical in shape and of mass lying in the range 2.5 kilograms (kg) to 4.7 kg.

More generally, present and future definitions of pedestrian head impacts use criteria that can vary as a function of location and period. The person skilled in the art can easily adapt to the appropriate criteria when implementing the present invention.

The theoretical impact is that of a head of a pedestrian knocked over by a vehicle and lying on the front of the vehicle. If the impact of the head lies in the middle region of the hood, then indentation of the hood can suffice to absorb enough energy to preserve the pedestrian's head, providing other difficulties specific to hood impacts are properly handled, which difficulties lie outside the ambit of the present description. In contrast, if the corresponding impact zone coincides with the top edge of a fender, there is a risk that the intrinsic stiffness of the fender rim, plus that of the hood rim which is adjacent to the fender rim, will reduce the amount of energy that is absorbed and will lead to the pedestrian's head being decelerated too quickly.

OBJECTS AND SUMMARY OF THE INVENTION

The present invention seeks to propose a novel fender support part which, like prior art supports, enables the fender to be positioned easily and accurately on the structure of the vehicle, and relative to other bodywork parts of the vehicle, while simultaneously effectively damping the impact of a pedestrian's head against the top edge of the fender.

In addition, the new fender support part of the invention makes it possible to comply effectively with the usual constraints of specifications for a motor vehicle fender, such as ability to withstand sunlight, ability to withstand being indented, or being sat upon.

In addition to absorbing energy, the support of the invention seeks to provide additional stiffness to the fender, by means of its own particular structure.

The present invention provides a support for a motor vehicle fender, the support comprising a metal core having a top portion provided with fasteners for a fender, wherein said top portion is provided with ribs arranged to stiffen the support when stressed in the transverse direction and to buckle in the event of impacts that are directed downwardly while the fender support is mounted on the vehicle.

Thus, the support of the invention presents the two characteristics of possessing a metal core, e.g. made of sheet metal, and of having ribs that serve firstly to provide a Y-direction stiffening function, and secondly a Z-direction absorption function by the ribs buckling and the core deforming.

The term "Y-direction" is used to mean a direction extending transversely to the vehicle, perpendicularly to the vertical direction which is the "Z-direction", and to the longitudinal direction or running direction of the vehicle referred to as the "X-direction".

By means of its ribs, the support of the invention can satisfy the Z-direction deceleration criterion for impacts against the heads of pedestrians.

In a particular embodiment, the metal core includes openings seeking to reduce its stiffness in the Z-direction so as to satisfy predefined deceleration criteria.

The support of the invention is particularly adapted to fenders made as a single piece of plastics material, making it easier to handle impacts against the heads of pedestrians because of their smaller stiffness in the vicinity of their top edges.

In a particular embodiment of the invention, the ribs do not present lateral cohesion with the metal core, so as to be capable of buckling in the event of an impact.

Preferably, the ribs extend vertically over a range of 60 millimeters (mm) to 90 mm, as a function of the shape of the fender and of the vehicle structure, and also as a function of the effectiveness desired for the protection.

In this embodiment, the ribs extend parallel to vertical planes and they are connected to the metal core via their ends only, being free over their full height. Thus, a force applied to the support, mainly in the vertical direction, stresses no connection other than bearing points between the ribs and the core, and enables the core to deform and the ribs to buckle, without combining the second moments of area of the core and of the ribs.

In order to perform their stiffening function in the Y-direction, the ribs are advantageously perpendicular to the general vertical plane of the core, i.e. they are perpendicular to the longitudinal direction of the vehicle. In this way, even without cohesion with the core, the ribs can contribute to providing the support with strength in the event of being stressed transversely, e.g. in the event of an impact, or in the event of thrust or thermal expansion of the fender.

In addition, this shape and disposition of the ribs make it easier to hold the fender in the Y-direction and limits the amount of movement it can perform in the transverse Y-direction.

In another particular embodiment of the invention, compatible with the preceding embodiments, the ribs are overmolded onto the metal core, by any known overmolding technique.

Preferably, the ribs and the openings are arranged in such a manner that the stiffening of the fender support varies along the fender support. For example, it can be important for the fender support not to react in the same way to an impact with the head of a child and to an impact with the head of an adult, by presenting smaller stiffness at locations of the fender support that are liable to receive an impact from the head of a child. In order to reduce this stiffness at those locations of the fender support that are liable to receive an impact from the head of a child, it is possible, for example, to arrange openings that are larger, or to space the ribs further apart, or to act on the thickness or the shape of the ribs.

In another particular embodiment, compatible with the preceding embodiments, the support of the invention includes a rigid bottom portion for fixing the support to the structure of the vehicle.

This bottom portion is advantageous firstly as a portion for fixing the support to the structure of the vehicle.

However it presents another advantage which can be essential for providing effective protection in the event of an impact against the head, i.e. it is of varying height, thus enabling the support to accommodate differences in the amount of space available in the Z-direction between the vehicle structure and the top edge of the fender, while ensuring that the top portion of the support conserves a height that is constant, and thus effectiveness in absorbing energy that is constant.

According to other advantageous characteristics of the invention which can be taken singly or in combination:
  the metal core may be of S-shaped or C-shaped section;
  the bottom portion of the metal core includes an array of stiffening ribs;
  the metal core includes fixing holes for a fender, and optionally for the structure of the vehicle; and
  additional fixing shapes are overmolded on the metal core, together with the ribs, so as to provide the fender support with additional functions.

The metal core of the fender support of the invention preferably includes at least one interface piece for providing an interface with a bodywork part that is adjacent to the fender, e.g. a hood. When the interface piece is a lock, or any other means for holding the hood to the fender support, the hood will accompany the fender support as it deforms in the event of an impact against the head. Otherwise, the interface piece may be an abutment of the hood, or a support for a hood sealing strip.

BRIEF DESCRIPTION OF THE DRAWINGS

In order to make the invention easier to understand, there follows a description of embodiments that are given as examples that do not limit the scope of the invention, and with reference to the accompanying drawings, in which.

MORE DETAILED DESCRIPTION

Figure 2:
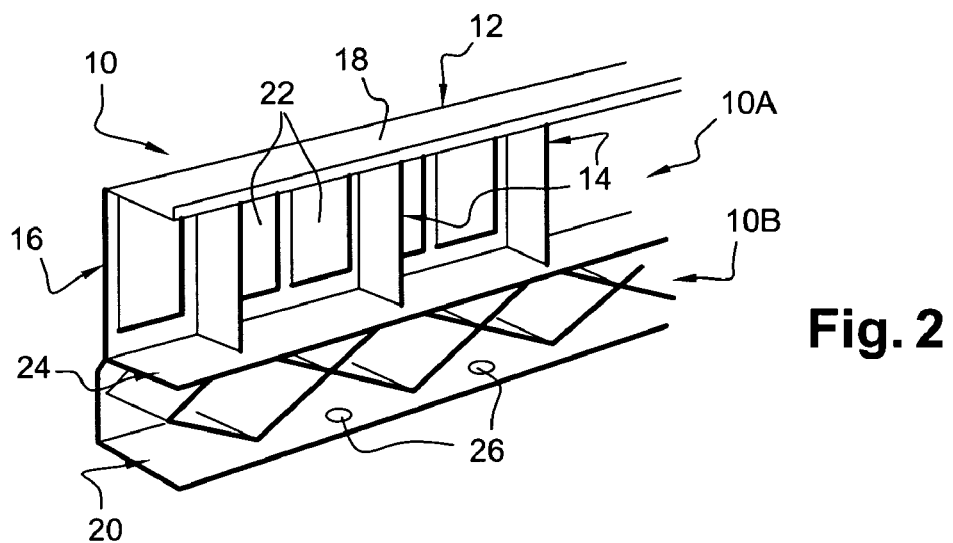
FIG. 2 is a view analogous to FIG. 1 showing the support as seen from the inside.

The support shown in the drawings, given overall reference 10, is of hybrid structure, being constituted by a core 12 of sheet metal having a C-shaped vertical section (as seen in FIG. 2) and by ribs 14 made of thermoplastic material.

More precisely, the metal core 12 comprises a vertical wall 16 (vertical in the orientation of the drawing) and two substantially horizontal rims 18 and 20 (horizontal in the orientation of the drawing) extending perpendicularly to the vertical wall 16 in the longitudinal direction of the support 10.

The support 10 is functionally subdivided into two portions 10A and 10B that are situated in the example shown above and below a setback, even though this coincidence is fortuitous.

Figure 3:
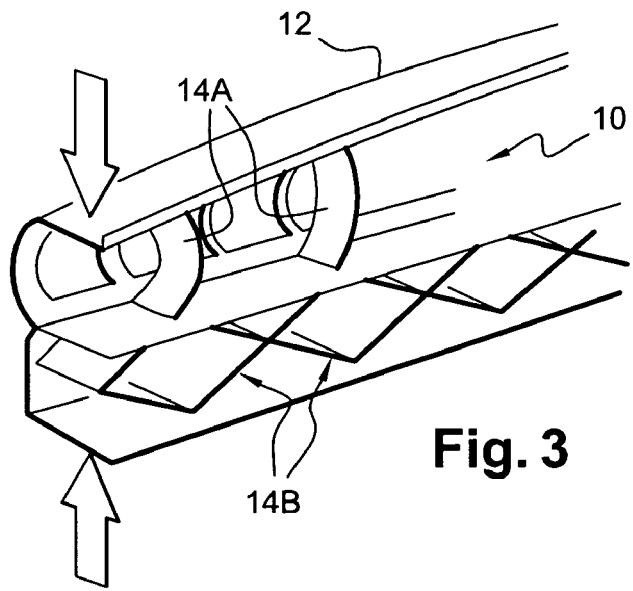
FIG. 3 is a view analogous to FIG. 2 showing the fender support deforming under the effect of vertical compression.
Figure 4:
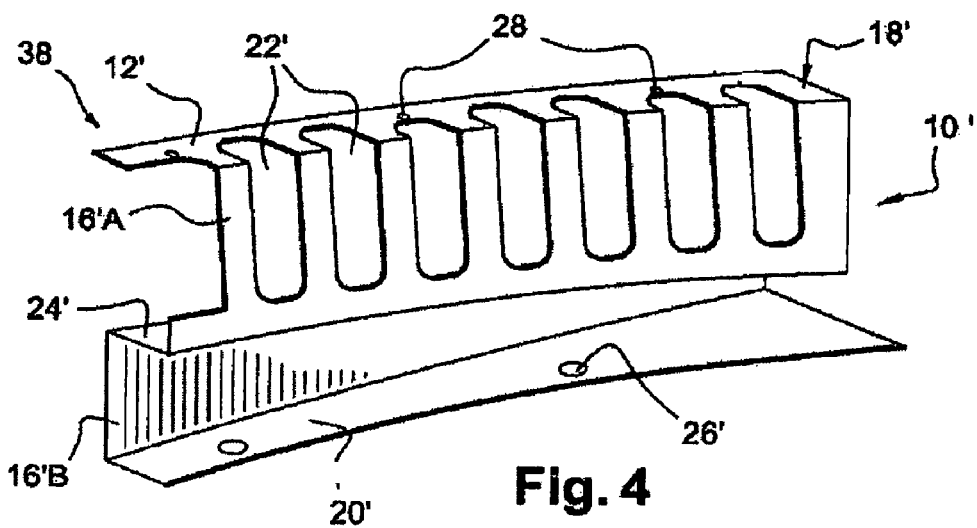
FIG. 4 is a perspective view of the metal core of a fender support constituting a second embodiment of the invention, as seen from the outside.

The top portion 10A has rectangular openings 22 formed through the vertical wall 16. The function of these openings 22 is to reduce the stiffness in the Z-direction of the metal core 12 in this top portion 10A so as to make it easier to form in the event of vertical compression, as shown in FIG. 3.

In this figure, the top arrow represents the force exerted on the support 10 by the top edge of a fender receiving the impact of a pedestrian's head, while the bottom arrow represents the reaction from the structure of the vehicle, showing that the support 10 is indeed compressed vertically.

The bottom portion 10B of the support 10 does not have openings, and is stiffer than the top portion 10A, so it does not deform during such compression.

The difference in the behavior of the top and bottom portions 10A and 10B of the support 10 is accentuated by the ribs 14 which are described below.

Like the metal core 12, the ribs 14 are subdivided into two groups, 14A and 14B, a top group and a bottom group.

The ribs 14A of the top group extend vertically (in the orientation of the drawing), i.e. perpendicularly to the rims 18 and 20, and perpendicularly to the vertical wall 16 of the core 12. They are distributed along the length of the support 10 with one rib for two openings 22.

The top and bottom portions 10A and 10B of the support are separated by a plane 24 that is integrally molded with the ribs 14, being disposed substantially parallel to the rim 18 of the metal core 12.

This plane 24 serves as a bearing surface for the ribs 14A of the top group via its own top face, and for the ribs 14B of the bottom group by its own bottom face.

The ribs 14 are made by being overmolded on the metal core 12 and they adhere to the inside face of the core 12. Nevertheless, by way of exception, the ribs 14A of the top group are not connected to the vertical wall 16 and are consequently connected to the metal core 12 only via their top edges which adhere to the bottom face of the top rim 18.

As a result, the ribs 14A of the top group present a very small second moment of area in the vertical direction, so vertical compression applied to the support causes its top portion to flatten, with the ribs 14A buckling easily without being retained by the vertical wall 16 of the metal core 12, as can be seen clearly in FIG. 3.

In other words, the ribs 14A of the top group do not impede deformation of the top portion 10A of the support in the event of an impact with the head of a pedestrian.

In contrast, these ribs 14A do indeed perform a stiffening function for the support 10 in the event of a force being applied transversely, i.e. in the Y-direction of the vehicle, in the event of lateral stress being applied to the fender, since their second moment of area in the Y-direction is greater for two reasons: firstly they are held via their ends to the top edge 18 of the metal core 12 and to the separation plane 24, such that they are prevented from buckling, and secondly they are shorter in said transverse Y-direction than they are in the vertical Z-direction, and consequently, for given radius of curvature, they are more difficult to flatten, even supposing they are free to be flattened.

The separation plane 24 is also secured to the vertical wall of the fender.

The ribs 14B of the bottom group are arranged as a honeycomb, being inclined relative to the bottom edge 20 of the core 12 and to the separation plane 24, and crossing one another mutually. Their edges are secured to the bottom portion 10B of the metal core 12, i.e. to the bottom edge 20, and to the bottom portion of the vertical wall 16 and to the separation plane 24 between the two groups of ribs.

Being arranged in this way and held in an array, the ribs 14B of the bottom group constitute a rigid structure suitable for withstanding stresses transmitted by the fender in the event of an accident.

In addition, their orientation gives them a larger second moment of area in the Y-direction, thus enabling them to act as dampers in the event of lateral stress being applied to the fender, and enabling them at least to hold the fender durably in the transverse, Y-direction of the vehicle.

The bottom portion 10B of the support, as stiffened by the ribs 14B, may thus include means 26 for enabling it to be fastened to the structure of the vehicle.

Thus, the support 10 as a whole constitutes means for durably positioning the fender, in particular in the vertical, Z-direction.

In a variant (not shown), the separation plane between the two groups of ribs is constituted by a metal sheet secured to the metal core, and fitted thereto by any suitable means, e.g. by welding.

In another embodiment, shown in FIGS. 4 to 8, the metal core 12' presents a cross-section that is S-shaped rather than C-shaped. In this case, a half of the part of the vertical wall 16' is situated inside the support 10' and its other half is situated outside the support 10', and the separation plane 24' is constituted by a horizontal portion of the core 12' interconnecting the two halves of the vertical wall 16'. Preferably, the top portion 16'A of the vertical wall 16' is on the outside, and its bottom portion 16'B is on the inside, thus enabling orifices 26' for fastening the support 10' to the structure of the vehicle to be provided and ensuring that the support 10' is simple to mount on said structure. Furthermore, the top portion 16'A may also include orifices 28' for securing the fender.

Figure 1:
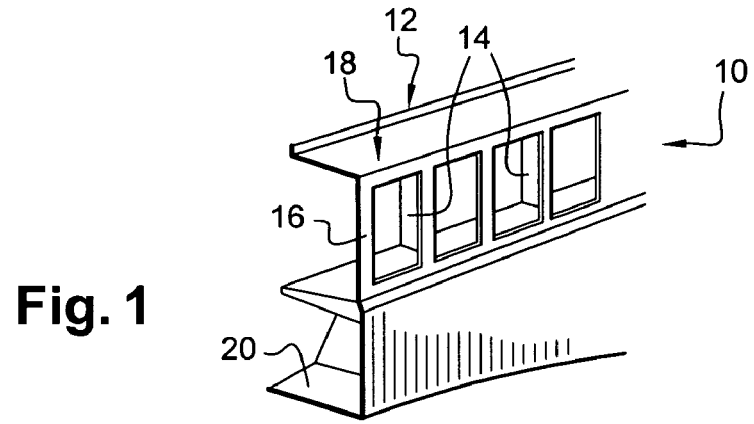
FIG. 1 is a perspective view of an end portion of a fender support constituting a first embodiment of the invention, as seen from the outside.

Other structural differences between the support of FIGS. 4 to 8 and that of FIGS. 1 to 3 can be emphasized:
- the ribs 14'A of the top group are distributed at a density of one between each pair of successive openings 22'; and
- the openings 22' extend into the top edge 18' of the metal core 12'.

The behavior of the support 10' in this second embodiment is substantially the same as the behavior described above for the first embodiment.

Figure 5:
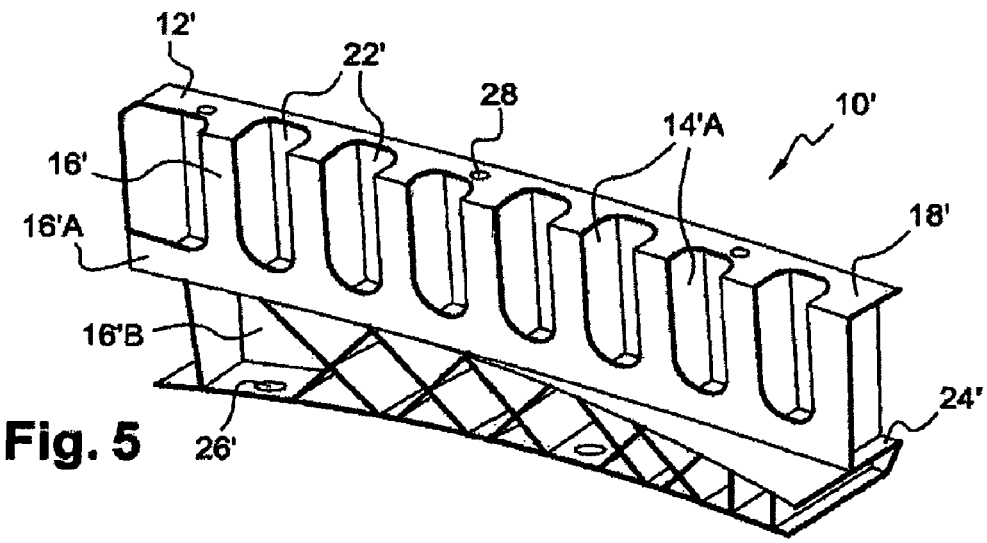
FIG. 5 is a perspective view seen looking along direction V in FIG. 4, showing the core carrying ribs.
Figure 6:
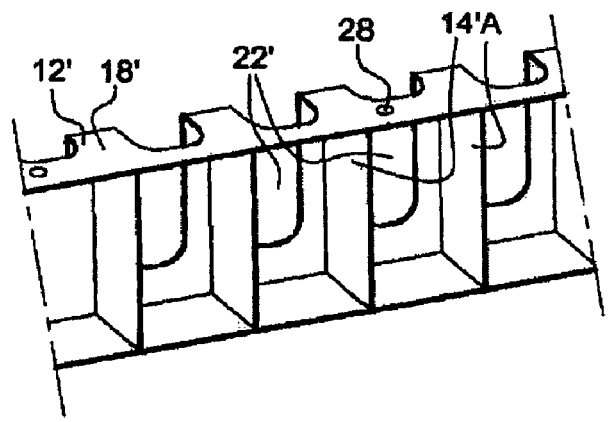
FIG. 6 is a view on a larger scale of a region VI of the FIG. 5 support, as seen from the inside.

In FIG. 5, it can clearly be seen that the bottom portion of the support presents a height that tapers towards the front of the vehicle, while the top portion presents a height that is constant.

Thus, the effectiveness of protection provided in the event of a head impact remains the same regardless of the point at which a pedestrian's head impacts along the top edge of the fender.

Figure 8:
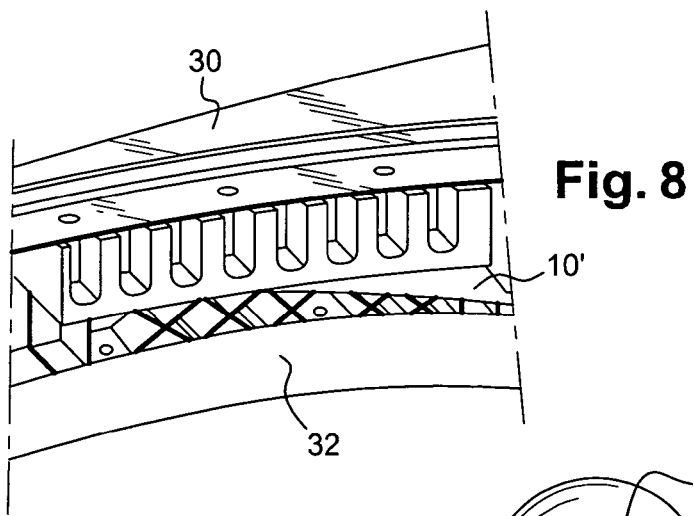
FIG. 8 shows the support in position, as seen from the inside, between a fender and the structure of the vehicle.

In FIG. 8, there can be seen the arrangement of the support between a fender 30 and the structure of the vehicle constituted in this case by a top side rail 32.

The structure of the vehicle is then high and low. It comprises two top side rails 32 that are lower than a conventional configuration with conventional side rails (not shown).

Figure 7:
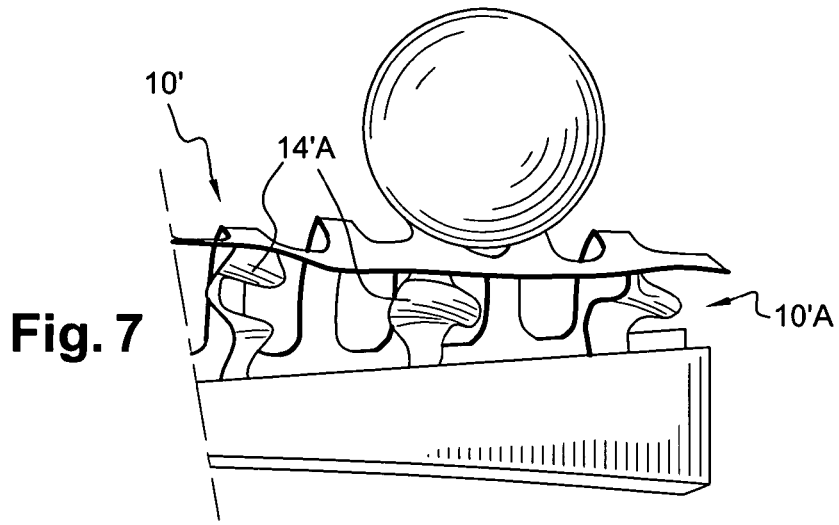
FIG. 7 is a view analogous to FIG. 6 while the support is being deformed.

In particular, in the event of a vertical impact against the head of a pedestrian, as shown in FIG. 7, the ribs 14'A of the top group buckle and do not prevent the top portion 10'A of the support 10' from flattening, thereby absorbing the energy of the impact and preserving the pedestrian's head as well as possible.

Figure 9:
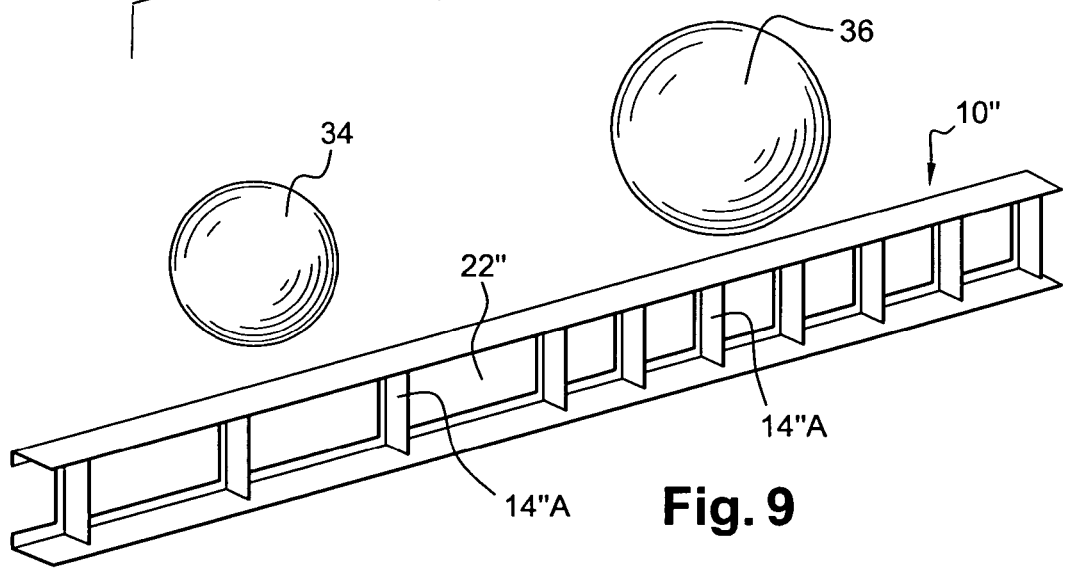
FIG. 9 is a perspective view of an end portion of a fender support constituting a third embodiment of the invention, as seen from the inside.

In a third embodiment, shown in FIG. 9, the ribs 14"A and the openings 22" are arranged in such a manner that the stiffening of the fender support 10" varies along said fender support 10".

In a zone of the fender support 10" that is liable to receive an impact from the head of a child, the child's head being modeled by a sphere 34, the openings 22" are larger, and the ribs 14"A are spaced further apart, than in a zone of the fender support 10" that is liable to receive an impact from the head of an adult, with the adult head being modeled by a sphere 36.

In each of the embodiments described, the metal core (12; 12'; 12") may include at least one interface piece 38 (see FIG. 4) providing an interface with a bodywork part adjacent to the fender, e.g. a hood.

Naturally, the embodiments described above do not present any limiting nature and may be modified in any desirable manner without going beyond the ambit of the invention.

What is claimed is:

1. A support for a motor vehicle fender, the support comprising a vertical wall connected to a top wall and a bottom wall, and having a metal core having a top portion provided with fasteners for a fender, wherein said top portion is provided with ribs arranged to stiffen the support when stressed in the transverse direction while the fender support is mounted on a vehicle, the ribs are connected to the top wall and the bottom wall and separated from the vertical wall, so as to buckle in the event of impacts that are directed downwardly while the fender support is mounted on the vehicle.

2. A motor vehicle fender support according to claim 1, in which the ribs extend vertically over a range of 60 mm to 90 mm, as a function of the shape of the fender and of the vehicle structure.

3. A motor vehicle fender support according to claim 1, in which the ribs are formed parallel to vertical planes, and the top wall is a horizontal rim and the bottom wall is a separation plane.

4. A motor vehicle fender support according to claim 1, in which the ribs are perpendicular to the general vertical plane of the core.

5. A motor vehicle fender support according to claim 1, in which the ribs are overmolded on the metal core.

6. A motor vehicle fender support according to claim 1, in which the metal core has a section that is S-shaped or C-shaped.

7. A motor vehicle fender support according to claim 1, in which the fastenings for enabling the fender to be fastened to the metal core are fastening holes.

8. A motor vehicle fender support according to claim 1, in which the metal core includes at least one interface piece for providing an interface with a bodywork part that is adjacent to the fender.

9. A motor vehicle fender support according to claim 1, in which the metal core includes openings seeking to reduce stiffness of the metal core.

10. A motor vehicle fender support according to claim 9, in which the ribs and the openings are such that the stiffening of the fender support varies along said fender support.

11. A motor vehicle fender support according to claim 1, and including a rigid bottom portion for securing to the vehicle structure.

12. A motor vehicle fender support according to claim 11, in which the rigid bottom portion is of varying height, enabling the support to accommodate differences in the space available in the Z-direction between the vehicle structure and the top edge of the fender, while conserving a height for the top portion of the support that is constant.

13. A motor vehicle fender support according to claim 11, in which the rigid bottom portion of the support includes an array of stiffening ribs.

* * * * *